United States Patent
Sokald et al.

(10) Patent No.: US 12,225,262 B2
(45) Date of Patent: Feb. 11, 2025

(54) SYSTEM AND METHOD FOR GENERATING A VIDEO SIGNAL

(71) Applicant: DISH Network L.L.C., Englewood, CO (US)

(72) Inventors: Mark Sokald, Littleton, CO (US); Justin Miller, Parker, CO (US)

(73) Assignee: DISH Network L.L.C., Englewood, CO (US)

( * ) Notice: Subject to any disclaimer, the term of this patent is extended or adjusted under 35 U.S.C. 154(b) by 394 days.

(21) Appl. No.: 17/546,964

(22) Filed: Dec. 9, 2021

(65) Prior Publication Data

US 2023/0050390 A1 Feb. 16, 2023

Related U.S. Application Data (60) Provisional application No. 63/232,552, filed on Aug. 12, 2021.

(51) Int. Cl.
*G06F 3/048* (2013.01)
*G06F 8/41* (2018.01)
(Continued)

(52) U.S. Cl.
CPC ............ *H04N 21/433* (2013.01); *G06F 8/45* (2013.01); *G06F 8/451* (2013.01); *G06F 8/453* (2013.01);
(Continued)

(58) Field of Classification Search
CPC ............ H04N 21/433; H04N 21/238; H04N 21/26291; H04N 21/2665;
(Continued)

(56) References Cited

U.S. PATENT DOCUMENTS 7,617,515 B1 11/2009 Laksono
8,863,202 B2 10/2014 Agnihotri et al.
(Continued)

FOREIGN PATENT DOCUMENTS

WO WO-2017102389 A1 * 6/2017 ............ H04N 5/445

OTHER PUBLICATIONS

SilverStar Satellite, DISH Network Hopper 3 Demo by SilverStar Satellite, YouTube, https://www.youtube.com/watch?v=Yd2d-cj2ZyQ (Year: 2016).*

(Continued)

*Primary Examiner* — Mohamed Abou El Seoud
(74) *Attorney, Agent, or Firm* — Kilpatrick Townsend & Stockton LLP (57) ABSTRACT

Disclosed herein is a receiver that generates a video signal. A first video is assigned to a first display layer of a plurality of display layers. A first trigger signal causes a first application to assign a first user interface to a second display layer, which is positioned over the first display layer. A second trigger signal causes a second application to assign a second user interface to a third display layer, which is positioned over the second display layer. The second trigger signal causes a reduction in a size of the first video, and a first portion of the third display layer and a second portion of the second display layer to be made transparent. The reduced size of the first video is positioned beneath the first portion. A combination of the first display layer, the second display layer, and the third display layer generates the video signal.

20 Claims, 8 Drawing Sheets

(51) Int. Cl.
| | |
|---|---|
| *G06F 8/70* | (2018.01) |
| *G06F 9/44* | (2018.01) |
| *G06F 9/451* | (2018.01) |
| *G10L 15/22* | (2006.01) |
| *H04B 7/185* | (2006.01) |
| *H04L 41/0893* | (2022.01) |
| *H04L 61/5014* | (2022.01) |
| *H04L 65/611* | (2022.01) |
| *H04N 21/238* | (2011.01) |
| *H04N 21/262* | (2011.01) |
| *H04N 21/2665* | (2011.01) |
| *H04N 21/433* | (2011.01) |
| *H04N 21/4363* | (2011.01) |
| *H04N 21/45* | (2011.01) |
| *H04N 21/462* | (2011.01) |
| *H04N 21/475* | (2011.01) |
| *H04N 21/478* | (2011.01) |
| *H04N 21/61* | (2011.01) |
| *H04N 21/81* | (2011.01) |
| *G06F 9/445* | (2018.01) |
| *H04L 101/668* | (2022.01) |

(52) U.S. Cl.
CPC ............... *G06F 8/70* (2013.01); *G06F 9/44* (2013.01); *G06F 9/451* (2018.02); *G10L 15/22* (2013.01); *H04B 7/18523* (2013.01); *H04L 41/0893* (2013.01); *H04L 61/5014* (2022.05); *H04L 65/611* (2022.05); *H04N 21/238* (2013.01); *H04N 21/26291* (2013.01); *H04N 21/2665* (2013.01); *H04N 21/43637* (2013.01); *H04N 21/4516* (2013.01); *H04N 21/4518* (2020.08); *H04N 21/4622* (2013.01); *H04N 21/475* (2013.01); *H04N 21/478* (2013.01); *H04N 21/6106* (2013.01); *H04N 21/6118* (2013.01); *H04N 21/6125* (2013.01); *H04N 21/6143* (2013.01); *H04N 21/818* (2013.01); *G06F 9/44521* (2013.01); *G10L 2015/223* (2013.01); *H04L 2101/668* (2022.05)

(58) Field of Classification Search
CPC ......... H04N 21/43637; H04N 21/4516; H04N 21/4518; H04N 21/4622; H04N 21/475; H04N 21/478; H04N 21/6106; H04N 21/6118; H04N 21/6125; H04N 21/6143; H04N 21/818; H04N 21/43615; H04N 21/43632; H04N 21/443; G06F 8/45; G06F 8/451; G06F 8/453; G06F 8/70; G06F 9/44; G06F 9/451; G06F 9/44521; G06F 9/54; G10L 15/22; G10L 2015/223; H04B 7/18523; H04L 41/0893; H04L 61/5014; H04L 65/611; H04L 2101/668
See application file for complete search history.

(56) References Cited

U.S. PATENT DOCUMENTS

| | | | |
|---|---|---|---|
| 10,091,065 B1 | 10/2018 | Gast et al. | |
| 10,349,059 B1* | 7/2019 | Good | H04N 19/115 |
| 11,184,660 B1 | 11/2021 | Ewanchuk et al. | |
| 11,227,620 B2 | 1/2022 | Igarashi | |
| 11,330,335 B1 | 5/2022 | Loritsch et al. | |
| 2006/0200849 A1 | 9/2006 | Sundararajan et al. | |
| 2009/0254639 A1 | 10/2009 | Manchester et al. | |
| 2009/0316706 A1 | 12/2009 | Hawley et al. | |
| 2010/0037271 A1 | 2/2010 | Crowe | |
| 2011/0158149 A1 | 6/2011 | Mugulavalli et al. | |
| 2012/0019732 A1 | 1/2012 | Lee et al. | |
| 2012/0173746 A1 | 7/2012 | Salinger et al. | |
| 2013/0031592 A1 | 1/2013 | Choi et al. | |
| 2013/0129324 A1* | 5/2013 | Uro | H04N 5/272 386/E5.028 |
| 2013/0223441 A1 | 8/2013 | Meyer et al. | |
| 2014/0153489 A1 | 6/2014 | Perras et al. | |
| 2015/0074735 A1* | 3/2015 | Herigstad | H04N 21/488 725/110 |
| 2015/0326921 A1* | 11/2015 | Makovetsky | H04N 21/4438 725/14 |
| 2017/0019372 A1 | 1/2017 | Panje | |
| 2017/0026712 A1 | 1/2017 | Gonder et al. | |
| 2017/0155580 A1 | 6/2017 | Ramanujan et al. | |
| 2017/0180790 A1 | 6/2017 | Howard | |
| 2017/0251026 A1 | 8/2017 | Straub et al. | |
| 2017/0331885 A1 | 11/2017 | Jakatdar et al. | |
| 2018/0070129 A1 | 3/2018 | Cholas et al. | |
| 2018/0146113 A1 | 5/2018 | Takahashi | |
| 2018/0176101 A1 | 6/2018 | Stephenson et al. | |
| 2019/0090154 A1 | 3/2019 | Olderdissen et al. | |
| 2020/0005735 A1* | 1/2020 | Kim | G06F 3/04817 |
| 2020/0379747 A1 | 12/2020 | Kaartinen et al. | |
| 2021/0051091 A1 | 2/2021 | Joseph et al. | |
| 2021/0241764 A1 | 8/2021 | Shin | |
| 2021/0385550 A1 | 12/2021 | Jothilingam et al. | |
| 2022/0337745 A1* | 10/2022 | Gu | H04N 21/21805 |
| 2022/0385988 A1 | 12/2022 | DiNatale et al. | |
| 2023/0052067 A1 | 2/2023 | Chu et al. | |

OTHER PUBLICATIONS

Thomson et al. "IPV6 Stateless Address Autoconfiguration" Network Working Group, RFC 4862, Sep. 2007, 30 pages.
U.S. Appl. No. 11/122,325, filed Sep. 14, 2021, Gupta et al.

* cited by examiner

SYSTEM AND METHOD FOR GENERATING A VIDEO SIGNAL

CROSS-REFERENCES TO RELATED APPLICATIONS

This application is a non-provisional of and claims the benefit of the filing date of U.S. Provisional Application No. 63/232,552, filed on Aug. 12, 2021, which is incorporated herein by reference in its entirety for all purposes.

FIELD

This disclosure generally relates to techniques of facilitating smart TV content receivers, and more particularly to generation of a video signal by a receiver in a local network.

BACKGROUND

Users of televisions and other video distribution platforms are now exposed to more varying types of content than ever before. However, with the proliferation of different content corresponding to televised and streamed events, a viewer can encounter a number of difficulties. The difficulties can include system performance deficiencies, as well as the amount of time and effort necessary to search for and interact with various systems providing content corresponding to events viewed via the platforms. The process of locating and interacting with optimal content features can be difficult, inefficient, and limited. Viewers are in need of better viewer experiences and interactive features.

Thus, there is a need for systems, methods, and processor-readable media that address the foregoing problems in order. This and other needs are addressed by the present disclosure.

BRIEF SUMMARY

Certain embodiments of the present disclosure relate generally to content corresponding to televised and streamed events, and more particularly to a receiver configured to generate a video signal based on a plurality of display layers.

By one aspect of the present disclosure, there is provided a method for generating a video signal by a receiver. In another aspect, there is disclosed a receiver including one or more processing devices and memory communicatively coupled with and readable by the one or more processing devices and having stored therein processor-readable instructions which, when executed by the one or more processing devices, cause the one or more processing devices to perform operations. In yet another aspect, one or more non-transitory, machine-readable media is disclosed as having machine-readable instructions thereon which, when executed by one or more processing devices, cause the one or more processing devices to perform operations. The operations and steps of the method, the receiver, and non-transitory, machine-readable media may include one or a combination of the following. A first video is assigned to a first display layer of a plurality of display layers. Responsive to receiving a first trigger signal, a first application assigns a first user interface associated with the first application to a second display layer. The first trigger signal causes the second display layer to be positioned over the first display layer. Responsive to receiving a second trigger signal, the first application transmits a first request to a second application. The first request causes the second application to assign a second user interface corresponding to the second application with a third display layer, and position the third display layer over the second display layer. The second application sends a second request to generate a reduced size of the first video assigned to the first display layer. The second request causes: (1) a first portion of the third display layer and a second portion of the second display layer to be made transparent, where the first portion overlaps the second portion, and (2) position the reduced size of the first video beneath the first portion or the second portion. The video signal is generated based on a combination of the first display layer, the second display layer, and the third display layer.

In various embodiments, the first trigger signal is received from a remote control device that is communicatively coupled with the receiver. The first trigger signal is generated upon a selection with respect to the remote control device being made by a user. The first user interface includes a plurality of tiles, each of which is associated with content provided by a service provider. By various embodiments, the second trigger signal is received in response to a selection of one of the plurality of tiles included in the first user interface. The second user interface includes a plurality of icons and metadata associated with the one of the plurality of tiles selected from the first user interface.

In various embodiments, responsive to receiving a third trigger signal, the second application transmits a third request that causes a second video to be assigned to the first display layer, resize the second video in the first display layer, and place the first display layer over the third display layer. It is noted that the third trigger signal is received in response to a selection of one of a plurality of icons included in the second user interface. By certain embodiments, the second video is different than the first video. The first video corresponds to a recording associated with a service provider, and the second video includes content associated with one of a plurality of tiles included in the first user interface. By certain embodiments, the receiver obtains a parameter indicative of a size of a display screen, where the reduced size of the first video is equal to a fraction of the size of the display screen. It is noted that a size of the first portion or the second portion is equal to the reduced size of the first video. According to some embodiments, an original size of the second video assigned to the first display layer is equal to the reduced size of the first video, and a final size of resized second video is equal to a size of a display screen.

Further, areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Various embodiments will now be discussed in greater detail with reference to the accompanying figures, beginning with FIG. 1.

Figure 1:
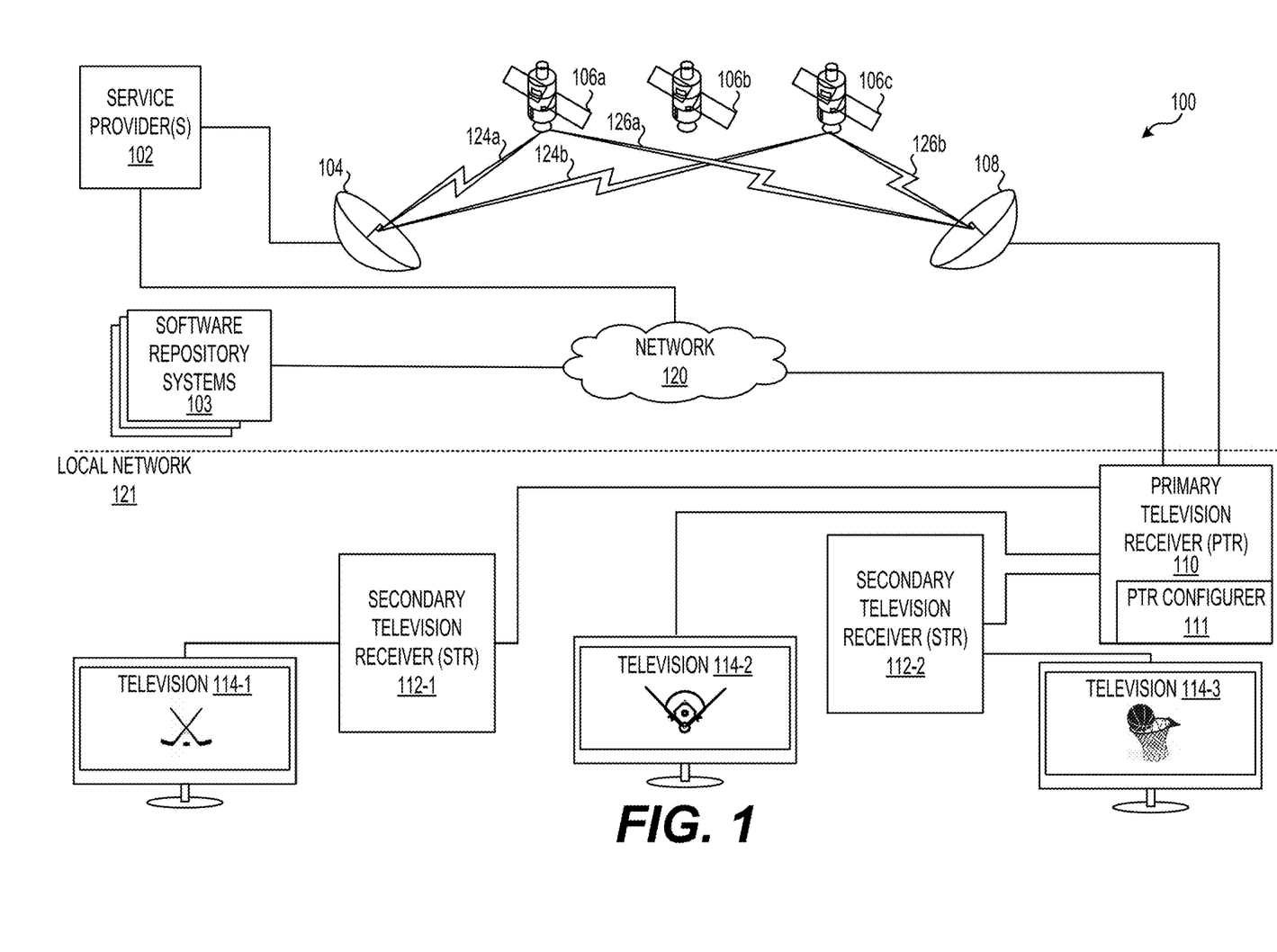
FIG. 1 illustrates an example media content distribution system in accordance with the present disclosure.

FIG. 1 shows an exemplary media content distribution system 100 in which aspects of the present disclosure may be implemented. For brevity, the system 100 is depicted in a simplified and conceptual form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The system 100 may include a service provider 102, a satellite uplink 104, a plurality of satellites 106 a-c, a satellite dish 108, a primary television receiver (PTR) 110, a plurality of secondary television receivers (STRs) 112, a plurality of televisions 114, and at least one software repository system 103. As disclosed herein, the PTR 110 and STRs 112 may correspond to smart TV content receivers. The televisions 114 may correspond to smart TVs.

The system 100 may also include at least one network 120 that may facilitate bi-directional communication for data transfer between the PTR 110, the service provider 102, and the software repository system 103. The network 120 is intended to represent any number of terrestrial and/or non-terrestrial network features or elements. For example, the network 120 may incorporate or exhibit any number of features or elements of various wireless and/or hardwired packet-based communication networks such as, for example, a wide area network (WAN), a home area network (HAN), a local area network (LAN), a wireless-local area network (W-LAN), Internet, a cellular network, or any other type of communication network configured such that data may be transferred between and among respective elements of the system 100.

The system 100 may also include at least one local network 121 that establishes a bi-directional communication path for data transfer between and among the PTR 110, STRs 112, and televisions 114 of the system 100. The local network 121 may correspond to a home computing environment. The PTR 110, together with the STRs 112 and televisions 114, may each be incorporated within or form at least a portion of a particular home computing network 121.

The PTR 110 and the STRs 112 as described throughout may correspond to television receivers, television converters, etc., such as a set-top box (STB) for example, configured as smart TV content receivers. In another example, the PTR 110 and the STRs 112, may exhibit functionality integrated as part of or into a television, a digital video recorder (DVR), a computer such as a tablet computing device, or any other computing system or device, as well as variations thereof. Further, the PTR 110 may be configured so as to enable communications in accordance with any particular communication protocol(s) and/or standard(s) including, for example, transmission control protocol (TCP)/Internet protocol (IP), digital living network alliance/digital transmission copy protection over Internet Protocol), high-definition multimedia interface/high-bandwidth digital content protection, etc. For instance, one or more of the various elements or components of the local network 121 may be configured to communicate in accordance with the MoCAR (Multimedia over Coax Alliance) home entertainment networking standard.

In practice, the satellites 106a-c may each be configured to receive uplink signals e.g., 124a, 124b, etc., from the satellite uplink 104. In this example, each of the uplink signals may contain one or more transponder streams of particular data or content, such as one or more particular television channels, as supplied by the service provider 102. For example, each of the respective uplink signals may contain various media content such as encoded High-Definition television channels, Standard Definition television channels, on-demand programming, programming information, and/or any other content in the form of at least one transponder stream, and in accordance with an allotted carrier frequency and bandwidth. In this example, different media content may be carried using different ones of the satellites 106*a-c*.

The satellites 106*a-c* may further be configured to relay the uplink signals (i.e., 124*a*, 124*b*) to the satellite dish 108 as downlink signals (represented as 126*a*, 126*b*). Similar to the uplink signals, each of the downlink signals may contain one or more transponder streams of particular data or content, such as various encoded and/or at least partially electronically scrambled television channels, on-demand programming, etc., in accordance with an allotted carrier frequency and bandwidth. The downlink signals however, may not necessarily contain the same or similar content as a corresponding one of the uplink signals. This may occur due to different user subscriptions. For example, the uplink signal 124*a* may include a first transponder stream containing at least a first group or grouping of television channels, and the downlink signal 126*a* may include a second transponder stream containing at least a second, different group or grouping of television channels. In other examples, the first and second group of television channels may have one or more television channels in common. In other words, there may be varying degrees of correlation between the uplink signals and the downlink signals, both in terms of content and underlying characteristics. Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers (e.g., HBO®, CBS®, ESPN®, etc.).

The satellite dish 108 may be provided for use to receive television channels (e.g., on a subscription basis) provided by the service provider 102, satellite uplink 104, and/or satellites 106*a-c*. For example, the satellite dish 108 may be configured to receive particular transponder streams, or downlink signals e.g., 126*a* or 126*b*, from one or more of the satellites 106*a-c*. Additionally, the PTR 110, which is communicatively coupled to the satellite dish 108, may subsequently select via tuner, decode, and relay particular transponder streams to a television 114-2 for display thereon. For example, the satellite dish 108 and the PTR 110 may, respectively, be configured to receive, decode, and relay at least one premium HD-formatted television channel to the television 114-2. Programming or content associated with the HD channel may generally be presented live, or from a recording as previously stored on, by, or at the PTR 110. Here, the HD channel may be output to the television 114-1 in accordance with the HDMI/HDCP content protection technologies. Other embodiments are however possible. For example, the HD channel may be output to the television 114-1 in accordance with the MoCA® home entertainment networking standard.

Further, the PTR 110 may select via tuner, decode, and relay particular transponder streams to one or both of the STRs 112, which may in turn relay particular transponder streams to a corresponding one of the televisions 114 for display thereon. For example, the satellite dish 108 and the PTR 110 may, respectively, be configured to receive, decode, and relay at least one television channel to the television 114-1 by way of the STR 112-1. It is appreciated that the television channel may be presented live, or from a recording as previously stored on the PTR 110, and may be output to the television 114-1 by way of the STR 112-1 in accordance with a particular content protection technology and/or networking standard.

According to some embodiments, the PTR 110 and the STRs 112 may be configured in a client-server architecture within the local network 121. Each STR 112 may operate and stream A/V content without communicating directly to a cloud server (e.g., without communicating to a remote system via the network 120). Each STR 112 may obtain the majority or all of its content from a PTR 110 with which the STR 112 is communicatively coupled (e.g., via one or a combination of MoCA, Wi-Fi, and/or the like) in the local computing network 121. In some examples, each STR 112 may obtain over the air (OTA) updates and smart TV OS-specific file format packages from the PTR 110.

In some embodiments, the PTR 110 may include, have installed thereon, be connected to, or otherwise be communicatively coupled to a PTR configurer 111. The PTR configurer 111 may adapt the PTR 110 currently deployed in a home computing environment to operate in accordance with various embodiments disclosed herein. In some embodiments, the PTR configurer 111 may correspond to an add-on device that configures the PTR 110 with the software components, and in some embodiments provides the necessary hardware components, to enable the PTR 110 to provide, among other things, the control and networking features to the local network 121, obtain over-the-top (OTT) services and stream to STRs 112, communicate with STRs 112, operate as a server in the client-server architecture to provide the various features to the STRs 112, utilize link-local IP addresses to provide the various features, obtain and provide the software update features to the STRs 112, and/or the like features disclosed herein. In some embodiments, the PTR configurer 111 may correspond to a dongle that may be connected to a port of the PTR 110. For example, the PTR configurer 111 may be connected by way of a USB connection and/or the like of the PTR 110. Accordingly, the PTR configurer 111 may allow for quick adaptation of a PTR 110 without the need for individualized integration, for example, without individualized Linux integration. It is appreciated that the description of the PTRs provided above is in no way limiting the scope of the present disclosure. Rather, other embodiments are possible, where pre-configured PTRs 110 may be initially configured with low-level software and hardware to perform the functionalities disclosed herein.

Figure 2:
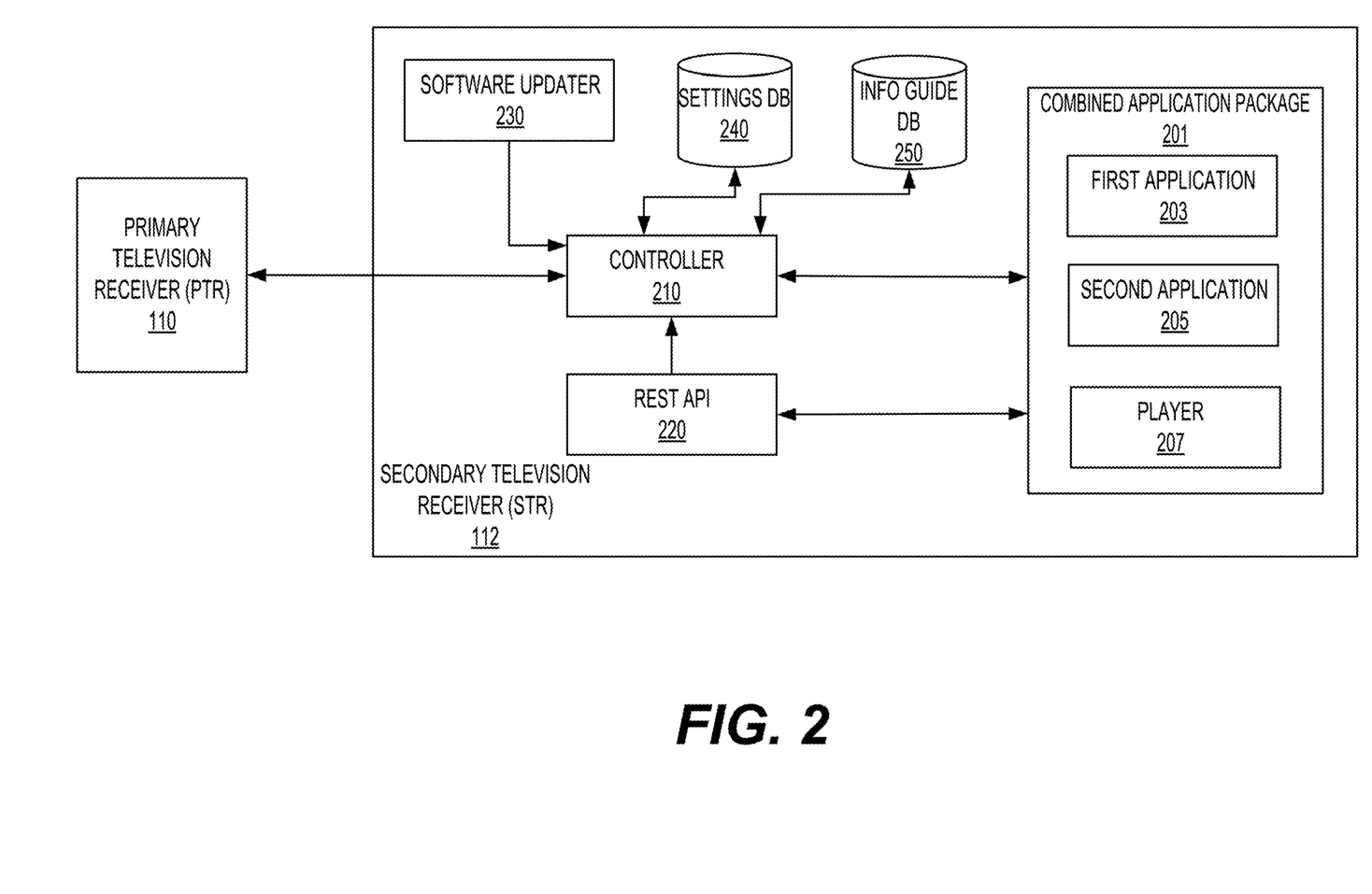
FIG. 2 illustrates an example block diagram of a secondary television receiver in accordance with the present disclosure.

FIG. 2 illustrates an example block diagram of a secondary television receiver in accordance with the present disclosure. As shown in FIG. 2, the secondary television receiver (STR) 112 is communicatively coupled with a primary television receiver (PTR) 110. The PTR 110 and the STR 112 may be configured with a link-local architecture to facilitate zero-configuration networking so that the STR 112 may communicate directly with the PTR 110, rather than relying on an Internet connection such as network 120. By using a link local IP address, disclosed embodiments may not require the existence of a router or an Internet connection in order for the PTR 110 and the STR 112 to communicate and operate, and to facilitate content streaming with reliable consumer-grade A/V services. The STR 112 includes a combined application package 201, a controller 210, one or more REST APIs 220, a software updater 230, a settings database 240, and an information guide database 250. The combined application package 201 includes a first application 203, a second application 205, and a player 207. It is noted that in some embodiments, the first application 203 is independent and different than the second application 205.

The software updater 230 is configured to allow the STR 112 to obtain software updates from the PTR 110, with the PTR 110 operating as a server for the STR 112. For example, the software updater 230 may obtain updated application packages and system image files from the PTR 110, decrypt them, and install them in the STR 112. In some embodiments, the software updater 230 may download and install the software packages in the background using flash partitions. The STR 112 includes the controller 210 that may be configured to provide services to manage TV sessions associated with the PTR 110, and to provide for connection ID management. As described later with reference to FIG. 3, when a channel change or playback operation is requested from a user-facing application, the controller 210 may perform a lookup of the IP address of the PTR 110, and thereafter create a connection to the PTR 110.

By some embodiments, the controller 210 is configured to provide a multi-layered (also referred to herein as a picture on top of a picture (POP)) user interface (UI) features on top of a video layer. The POP feature(s) may be achieved by molding a first UI associated with the first application 203, and a second UI associated with the second application 205. The POP functionality is achieved via an underlying messaging system utilized by the different components of the STR 112. Details pertaining to the generation of a video signal by the STR 112, which includes the POP functionality is described later with reference to FIG. 3. By some embodiments, the controller 210 communicates with databases such as the settings database 240 and the information guide database 250. The settings database 240 is configured to at least store information pertaining to device settings (e.g., display screen size, display settings, etc.,) of a television associated with the STR 112. The information guide database 250 may be configured to store information pertaining to programming media guide information e.g., a TV guide.

The first application 203 included in the combined application package 201 of the STR 112 may be configured to facilitate a first UI (i.e., a first screen) associated with the first application 201. The first UI may include a representation of content such as web applications downloaded by the STR 112, and/or a display of different programs (i.e., content) offered by a content service provider. The different programs may be arranged in a tile formation, wherein each tile includes information of the respective content provided by the service provider. By some embodiments, the first application 203 may cause display of installed applications received from the software repository system and may allow them to be launched.

In some embodiments, the first UI associated with the first application 203 may be the initial application seen (by a user) when the smart TV 114 starts. Additionally, the first application 203 may be configured to check whether the current mode is a standby mode when the television 114 boots in order to avoid using tuners on PTR devices when not needed. The second application 205 is associated with a second UI such as a guide screen, DVR screens, on-demand screens, etc. The player 207 included in the combined application package 201 of the STR 112 may be configured to facilitate playing of encrypted content obtained from the PTR 110, first application 203, second application 205, locally issued video trick modes (fast-forward, skip back, etc.), ad insertion, and may handle buffering for IP streaming content passed-through from the PTR 110.

The STR 112 may include a REST API application 220, configured to use APIs to facilitate server-client operations between the STR 112 and the PTR 110. For instance, the REST API 220 may allow the second application 205 to interface with native applications for local control and data, and may allow the second application 205 to invoke REST API commands on the PTR 110 via redirecting http requests to the appropriate host. The REST API application 220 may further allow external control of the STR 112 via either remote asynchronous events (RAE) or an open listening port. Additionally, the REST API application 220 may further allow applications to send events to the second application 205. It is appreciated that the REST API application 220 may also communicate with a wireless access point.

Figure 3:
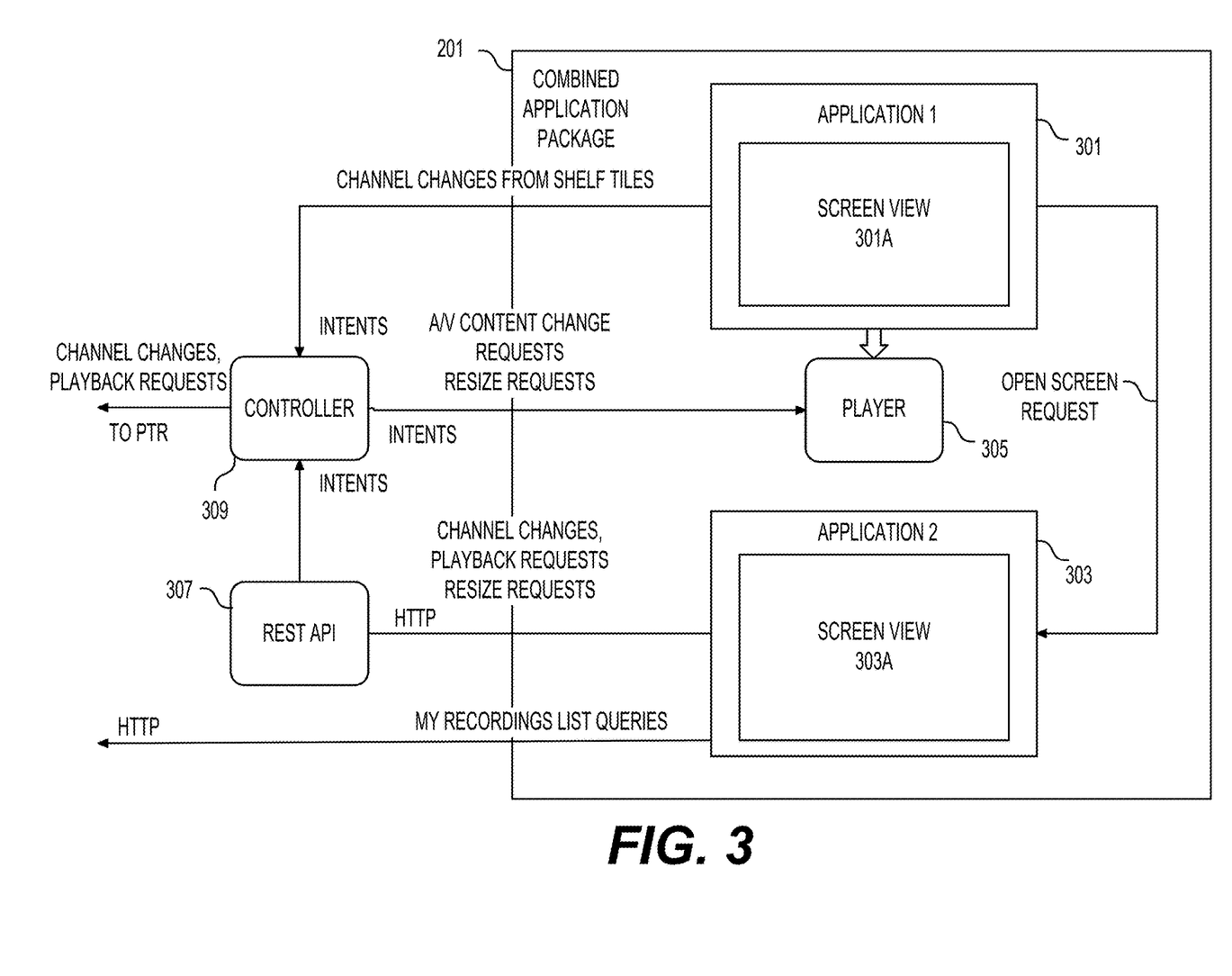
FIG. 3 illustrates aspects of a secondary television receiver with a focus on the underlying messaging framework utilized by components included therein in accordance with the present disclosure.

In what follows, there is provided with reference to FIG. 3, detailed description pertaining to the multi-layered UI features i.e., the POP features, obtained via the first UI (associated with the first application 203), the second UI (associated with the second application 205), and the player 220. Multi-layered UIs may, for example, allow POP features to provide, for instance, a guide to allow a user to select programs and channels while a currently selected channel is presented as an overlay. Shared video may be built so that a user can go from one set of screens to another and keep the video in a corner without having to restart-similar to transitioning between multiple apps, but grafted together into one interface facilitated by the combined application package 201.

Figure 4:
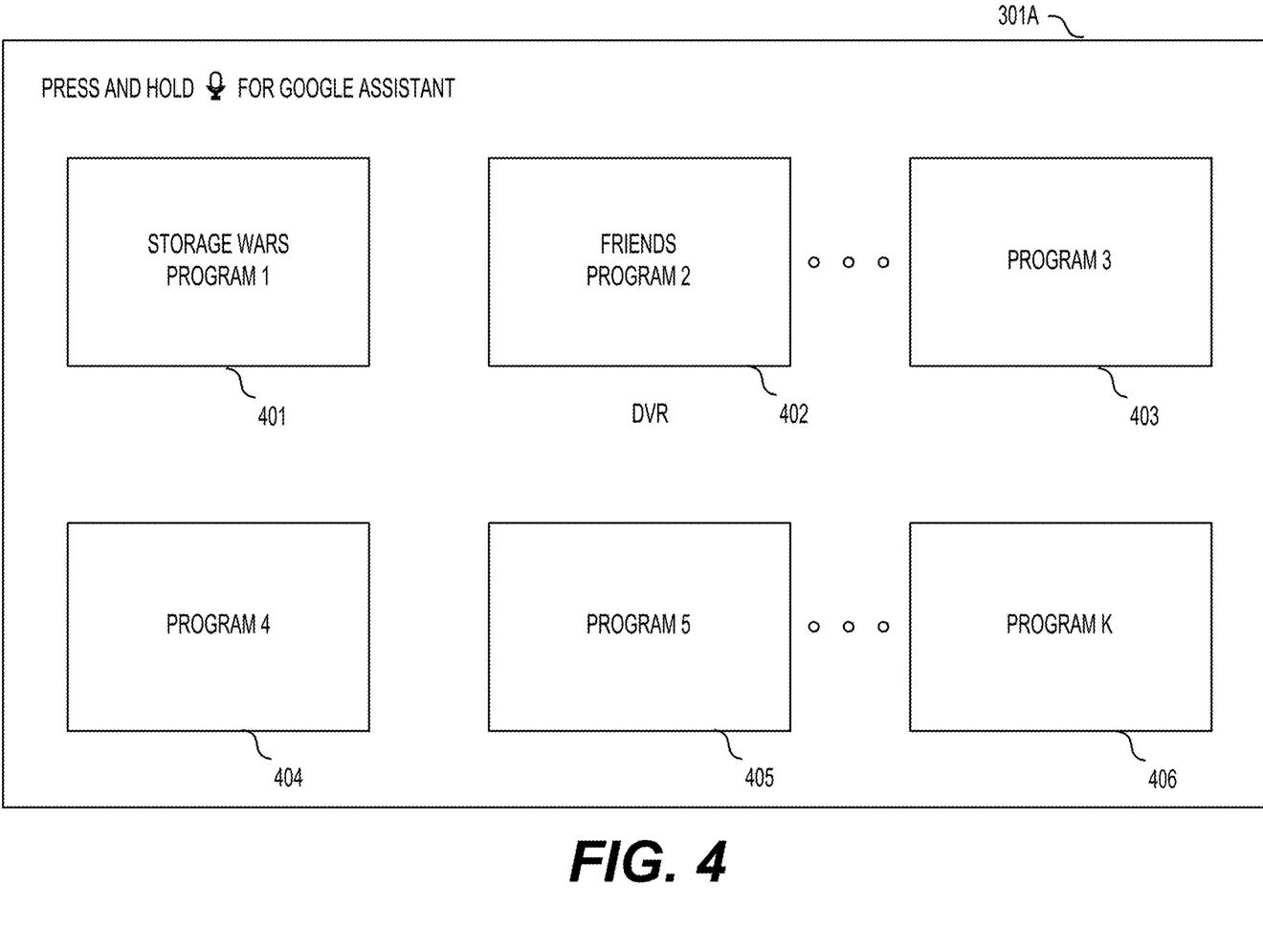
FIG. 4 illustrates an example first user interface associated with a first application in accordance with the present disclosure.

FIG. 3 illustrates aspects of a secondary television receiver (STR) with a focus on the underlying messaging framework utilized by components included therein in accordance with the present disclosure. As shown in FIG. 3, the STR includes a combined application package 201, REST API 307, and a controller 309. The combined application package 201 includes a first application (i.e., application 1) 301 that is associated with a first UI 301A, a second application (i.e., application 2) 303 that is associated with a second UI 303A, and a player 305. As stated previously, the first UI 301A may include a representation of content such as web applications downloaded by the STR 112, and/or a display of different programs (i.e., content) offered by a content service provider, whereas the second UI 303A may correspond to a guide screen, DVR screen, on-demand screen, etc. FIG. 4 illustrates an example of the first UI 301A associated with a first application 301, and FIG. 5 illustrates an example of the second UI 303A associated with a second application 303.

Referring to FIG. 4, there is provided an exemplary first UI 301A including a plurality of tiles 401-406 arranged in a matrix like formation. Each tile corresponds to a unique program offered by a service provider. For example, tile 401 corresponds to a television series program titled 'Storage Wars', whereas tile 402 corresponds to a television series program titled 'Friends'. Although not depicted in FIG. 4, it is appreciated that each tile may include a visual representation (e.g., a picture), and contextual information (e.g., number of episodes of the program, cast of the program, etc.) depicted within the respective tile. Additionally, it is appreciated that each tile may be selectable (via a user operating a remote control device), such that when a user selects a particular tile, additional information related to the selected tile is provided to the user. Moreover, the layout of the tiles 401-406 is in no way limited to be in the matrix form. It is appreciated that the tiles may be arranged in any other form(s).

Figure 5:
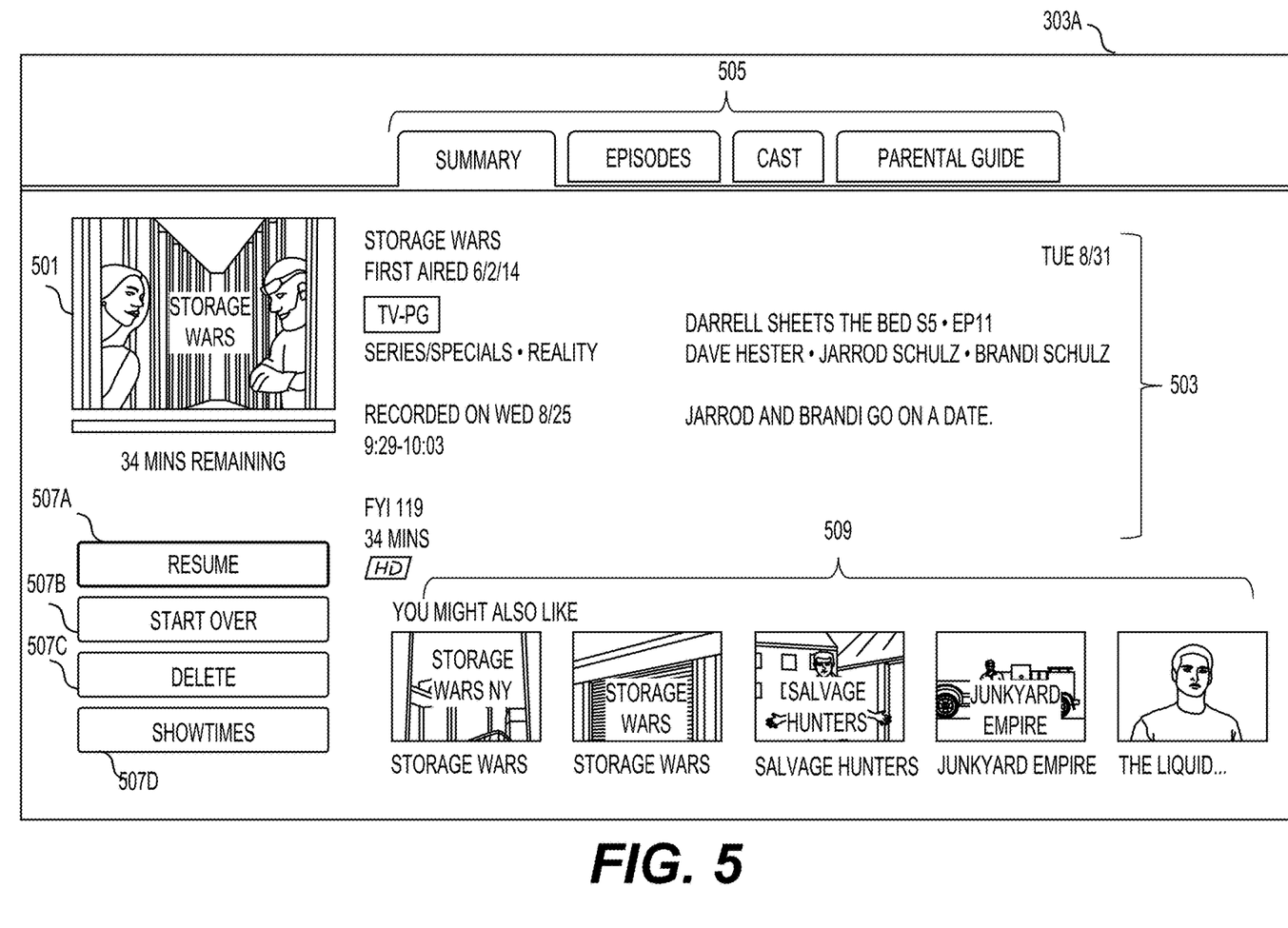
FIG. 5 illustrates an example second user interface associated with a second application in accordance with the present disclosure.

Referring to FIG. 5, there is provided an exemplary second UI 303A associated with the second application 303. For sake of illustration, the second UI 303A depicted in FIG. 5 corresponds to guide information corresponding to tile 401 of FIG. 4. For instance, the second UI 303A includes a video display of the program (i.e., 'storage wars') 501 including an indication of an amount of time left (e.g., 34 minutes) for completion of viewing the current episode of the program, meta-information 503 associated with the episode, a toolbar including a first plurality of icons 505 associated with the program (e.g., icons such as 'summary', 'episodes', 'cast', 'parental guide', etc.), a second plurality of icons 507A-507D associated with the current episode of the program (e.g., icons such as 'resume', 'start over', 'delete', 'show times', etc.), and a scrollable list 509 of recommended content to the user. It is appreciated that each of the first plurality of icons 505, the second plurality of icons 507A-507D, or the scrollable list 509 may be accessed (and selected by the user) via a remote control device that is communicatively coupled to the STR 112.

Turning back to FIG. 3, the combined application package 201, which includes Application 1 301 (associated with first UI 301A), Application 2 303 (associated with second UI 303A), and the player 305 utilize a messaging framework to communicate with the controller 309 in order generate a video signal. Specifically, the combined application package 201 utilizes a plurality of display layers (also referred to herein as a stack of display layers) and determines via messaging, a positioning of each display layer within the stack of display layers. The STR is configured to generate a video signal based on the plurality of display layers.

By some embodiments, the controller 309 can receive content e.g., a video from the PTR and transmit the video to the player 305. The player 305 in turn, can assign the video to a first display layer of the plurality of display layers i.e., the stack of display layers. Upon receiving a trigger signal e.g., a first trigger signal from a remote control device that is communicatively coupled with the STR, Application 1 301 of the combined application package 201, may assign the first UI 301A (depicted in FIG. 4) associated with the first application to a second display layer of the stack of the display layers. Application 1 301 may further position the second display layer to be above the first display layer. It is noted that the first trigger signal may correspond to a signal that is generated upon the user making a selection with respect to the remote control e.g., the user pressing a DVR button on the remote control.

Consequently, in response to receiving another trigger signal e.g., a second trigger signal, the first application 301 may transmit a message to the second application 303. The transmitted message (depicted in FIG. 3 as an 'open screen request') corresponds to a message, which instructs the second application 303 to assign the second UI 303A (depicted in FIG. 5) to a third display layer of the stack of display layers and position the third display layer over the second display layer. It is noted that the second trigger signal may correspond to a signal that is generated upon the user selecting one of the tiles included in the first UI 301A via the remote control.

The second application 303 may transmit an HTTP request to a web server (e.g., denoted as REST API 307 in FIG. 3). The HTTP request can correspond to, for instance, a request to resize the video (e.g., assigned to the first display layer), a channel change request, or a play back request. By some embodiments, the REST API 307 upon receiving the HTTP request(s), extracts HTTP data from the request and converts the extracted data into a format that is accepted by the controller 309 e.g., a native Android format. Based on the type of request, the controller 309 executes the request and transmits the request to the player 305, or the PTR. For instance, a resize request is executed by the controller and transmitted directly to the player 305, whereas a request for a channel change or a playback request is transmitted by the controller 309 to the PTR in order to obtain the relevant content. Application 2, 303, may also be configured to issue HTTP requests in order to obtain (e.g., from a database) a list of recordings associated with a certain program. In a similar manner, the controller 309 is also configured to receive requests from the first application 301. Such requests, may for instance, correspond to requests for a change in channels via user selection of a different tile from the first UI 301A.

By some embodiments, upon the user selecting an icon associated with the second UI 303A (e.g., referring to FIG. 5, if the user selects the icon 507A to resume playing of a certain episode of a program), the second application 303 may be configured to switch (or replace) the first video originally assigned to the first display layer with a second video that corresponds to video associated with the selected episode of the program. Furthermore, the second application 303 may resize the second video to correspond to a size of a display screen on which the video is to be presented. In this manner, the combined application package 201 of the STR utilizes a messaging framework (between components of the STR) to generate a video signal based on the plurality of display layers. It is appreciated that although application 1 301, and application 2 303 are depicted as separate entities in FIG. 3, it is in no way limiting the scope of the present disclosure. For instance, a single application having the functionality of both application 1 301 and application 2 303, is well within the scope of the present disclosure. In what follows, there is provided with reference to FIG. 6 and FIG. 7, an exemplary illustration of generating a video signal based on the plurality of display layers.

Figure 6:
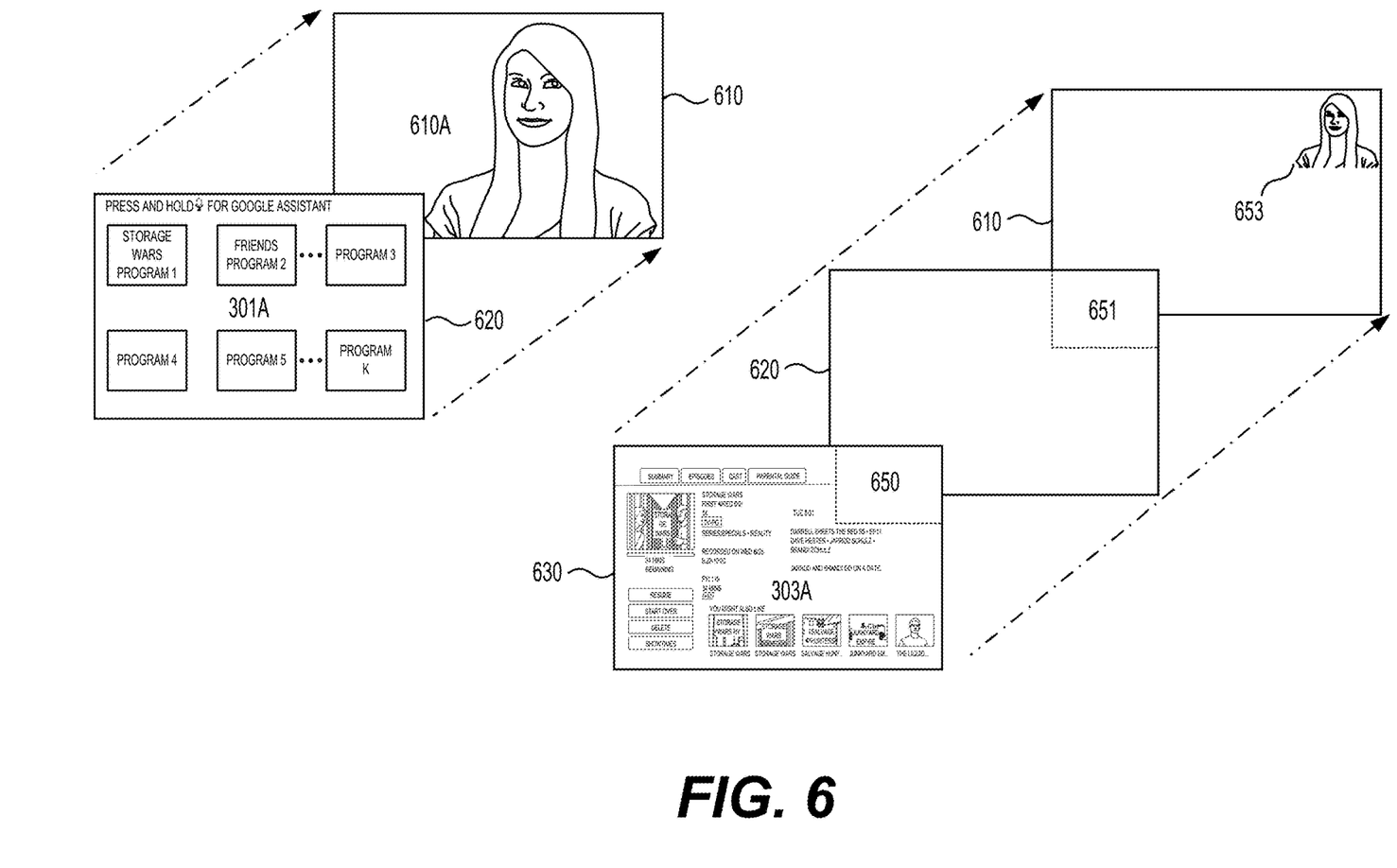
FIG. 6 illustrates an exemplary illustration of controlling a plurality of display layers by the secondary television receiver in accordance with the present disclosure.
Figure 7:
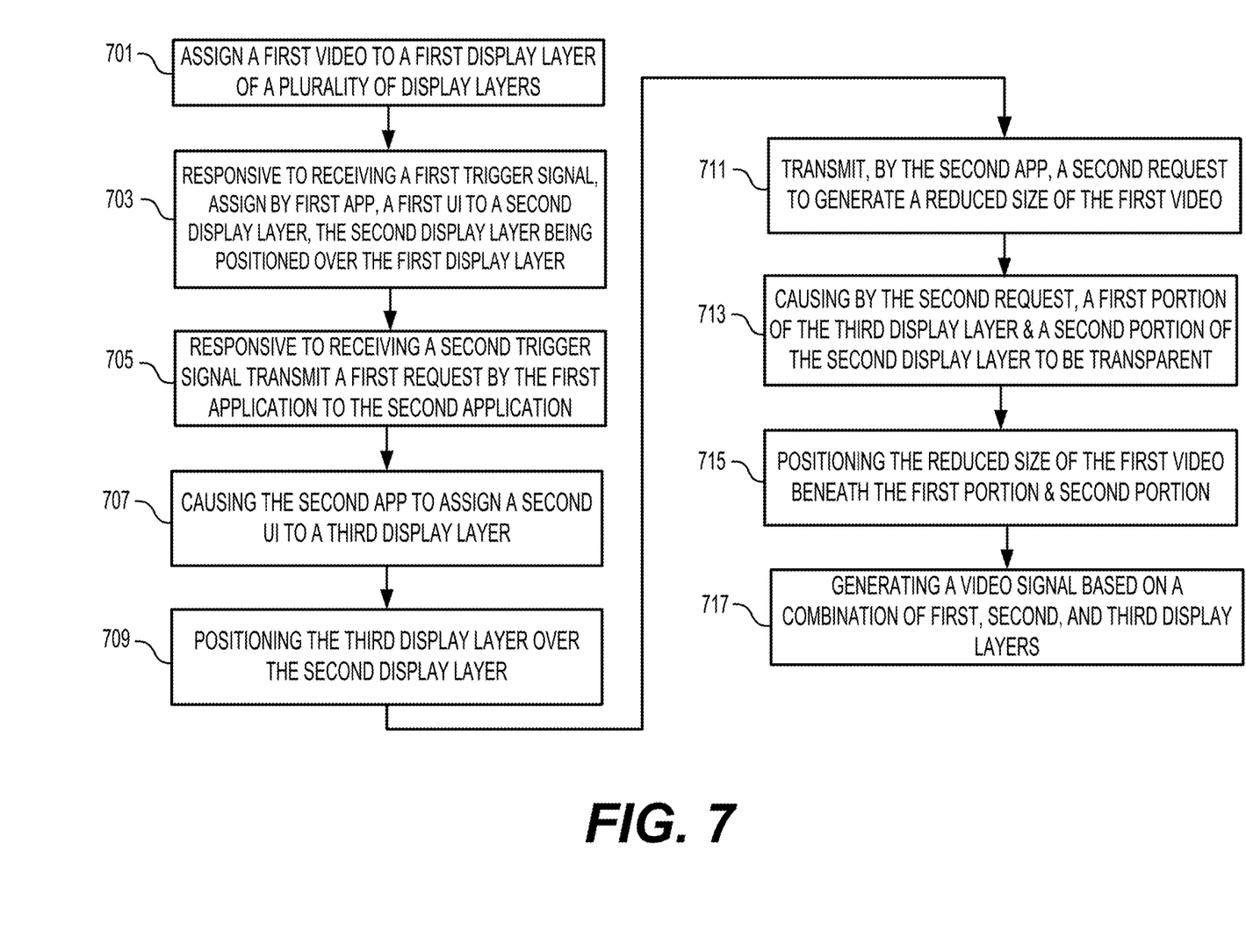
FIG. 7 illustrates an exemplary flowchart depicting a process performed by the secondary television receiver in accordance with the present disclosure.

Turning now to FIG. 6, there is depicted an exemplary illustration of controlling a plurality of display layers by the secondary television receiver in accordance with the present disclosure. FIG. 7 illustrates an exemplary flowchart depicting a process performed by the secondary television receiver in accordance with the present disclosure. Specifically, FIG. 7 depicts the steps performed by the STR in generating a video signal. In what follows, the steps of FIG. 7 are described with reference to the illustration depicted in FIG. 6.

It is appreciated that the processing depicted in FIG. 7 may be implemented in software (e.g., code, instructions, program) executed by one or more processing units (e.g., processors, cores) of the STR, hardware, or combinations thereof. The software may be stored on a non-transitory storage medium (e.g., on a memory device). The method presented in FIG. 7 and described below is intended to be illustrative and non-limiting. Although FIG. 11A depicts the various processing steps occurring in a particular sequence or order, this is not intended to be limiting. In certain alternative embodiments, the steps may be performed in some different order or some steps may also be performed in parallel.

The process commences in step 701, where a first video is assigned to a first display layer of a plurality of display layers. For instance, as shown in FIG. 6, a first video 610A is assigned to the first display layer 610. In step 703, upon receiving a trigger signal (e.g., a first trigger signal), a first application (e.g., application 301 included in a combined application package 201 of the receiver), assigns a first UI associated with the first application to a second display layer. For instance, as shown in FIG. 6, the first UI 301A is assigned to the second display layer 620. The first trigger signal also causes the second display layer 620 to be positioned over the first display layer 610. By some embodiments, the first trigger signal is received from a remote control device that is communicatively coupled with the STR. The first trigger signal may be generated upon a selection with respect to the remote control device being made by a user (e.g., the user pressing a DVR button on the remote control device).

The process then moves to step 705, where upon receiving another trigger signal (e.g., a second trigger signal), the first application (e.g., application 301) transmits a first request to a second application (e.g., application 303). It is appreciated that the second trigger signal is received in response to a selection of one of the plurality of tiles included in the first user interface. In step 707, the first request causes the second application to assign a second UI corresponding to the second application to a third display layer. For instance, as shown in FIG. 6, the second UI 303A is assigned to the third display layer 630. The first request further causes the third display layer 630 to be positioned over the second display layer 620 (step 709). As shown in FIG. 6, it is noted that upon the third display layer 630 being positioned over the second display layer 620, the contents included in the second display layer 620 (i.e., contents of the first UI) are not viewable.

In step 711, the second application (e.g., application 303) transmits a second request to generate a reduced size of the first video assigned to the first display layer 610. By some embodiments, the second request may be transmitted by the second application to a controller (e.g., controller 309 in FIG. 3). In step 713, the second request causes a first portion of the third display layer 630 and a second portion of the second display layer 620 to be made transparent, where the first portion overlaps the second portion. For instance, as shown in FIG. 6, the first portion 650 of the third display layer 630, and the second portion 651 of the second display layer 620 are made transparent. By some embodiments, the size of the first portion 650 is equal to the size of the second portion 651. The second request further causes the reduced size of the first video (in the first display layer) to be positioned exactly beneath the first portion or the second portion (step 715). For instance, as shown in FIG. 6, the reduced size of the first video 653 is positioned in a corner of the first display layer 610 such that the transparent portions of the third display layer and the second display layer (i.e., portions 650 and 651) overlap the reduced size of the first video, thereby causing the first video to be viewable. It is appreciated that the positioning of the reduced size of the first video 653 (as well as the transparent portions 650 and 651 of the third display layer and the second display layer) is in no way limited to be placed in the corner (e.g., top right hand corner) as depicted in FIG. 6. Rather, the reduced size of the first video 653, and the transparent portions 650 and 651 may be made to overlap and be positioned at any location on the display layers. Furthermore, it is appreciated that the STR may obtain a parameter indicative of a size of a display screen from the settings database (e.g., database 240 in FIG. 2) and cause the reduced size of the first video to be equal to a fraction (e.g., 20%) of the size of the display screen.

The process then proceeds to step 717, where the STR generates the video signal based on a combination of the first display layer, the second display layer, and the third display layer. It is noted that although the operations depicted in FIG. 7 are sequential, many of the operations can be performed in parallel or concurrently. In addition, the order of the operations may be rearranged. The process may have additional steps not included in the figure. For instance, prior to step 717, the STR may receive another trigger signal e.g., a third trigger signal, which causes the second application to transmit a third request. The third request causes a second video to be assigned to the first display layer. It is noted that the second video may be different than the first video. For example, the first video may correspond to a recording associated with a service provider, whereas the second video may include content associated with one of a plurality of tiles included in the first user interface (i.e., content associated with a selected program).

By some embodiments, the third trigger signal is received in response to a selection of one of a plurality of icons included in the second user interface (e.g., the user selecting 'resume' icon 507A in FIG. 5). In some embodiments, the third request resizes the second video in the first display layer, and positions the first display layer over the third display layer. In other words, an original size of the second video assigned to the first display layer is equal to the reduced size of the first video, and a final size of resized second video is equal to a size of a display screen.

Figure 8:
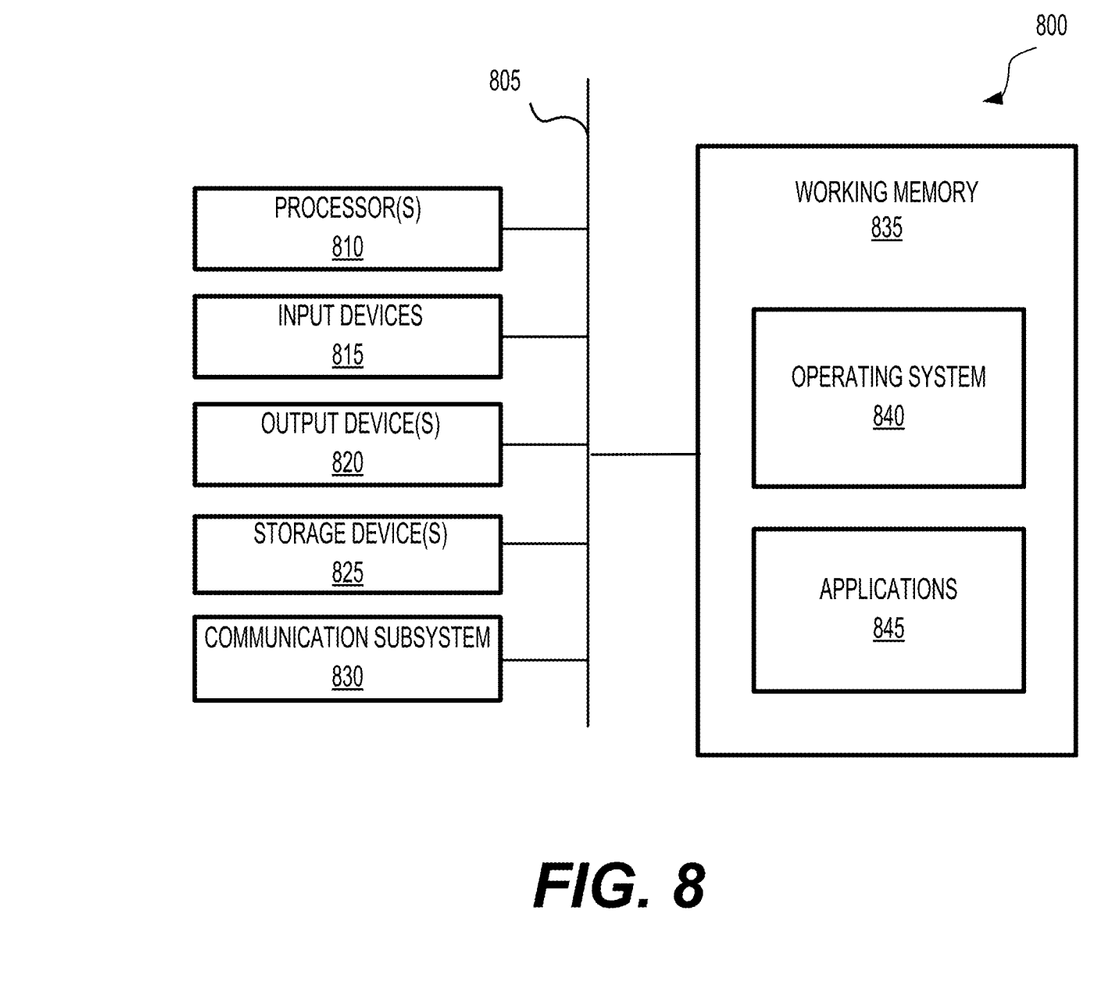
FIG. 8 provides a schematic illustration of one embodiment of a computer system that can implement various system components and/or perform various steps of methods provided by various embodiments.

Embodiments of the primary television receiver 110, secondary television receiver 112, or components thereof, can be implemented on, and/or can incorporate, one or more computer systems, as illustrated in FIG. 8. FIG. 8 provides a schematic illustration of one embodiment of a computer system 800 that can implement various system components and/or perform various steps of methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown including hardware elements that can be electrically coupled via a bus 805 (or may otherwise be in communication, as appropriate). The hardware elements may include one or more processors 810, including, without limitation, one or more general-purpose processors and/or one or more special-purpose processors (such as digital signal processing chips, graphics acceleration processors, video decoders, and/or the like).

As illustrated, some embodiments include one or more input devices 815 and/or output devices 820. The computer system 800 is configured to interface with additional computers, such that the input devices 815 and/or output devices 820 include various physical and/or logical interfaces (e.g., ports, etc.) to facilitate computer-to-computer interaction and control. Embodiments of the input devices 815 and output devices 820 can be configured to implement the television receivers (e.g., STR 112 and PTR 110), so that the computer system 800 can interface with televisions 114, or other receivers in the local network 121.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 825 include the non-transient memory. In some embodiments, the storage devices 825 can include one or more of the settings database 240, and the information guide database 250.

The computer system 800 can also include a communications subsystem 830, which can include, without limitation, any suitable antennas, transceivers, modems, network cards (wireless or wired), infrared communication devices, wireless communication devices, chipsets (such as a Bluetooth™ device, an 802.11 device, a WiFi device, a WiMAX device, cellular communication device, etc.), and/or other communication components. As illustrated, the communications subsystem 830 generally includes any suitable components for facilitating communications with network 120, televisions 114, satellite dish 108, etc.

In many embodiments, the computer system 800 will further include a working memory 835, which can include a RAM or ROM device, as described herein. The computer system 800 also can include software elements, shown as currently being located within the working memory 835, including an operating system 840, device drivers, executable libraries, and/or other code, such as one or more application programs 845, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods.

In some embodiments, the operating system 840 and the working memory 835 are used in conjunction with the one or more processors 810 to implement features of the STR 112. Embodiments of the one or more processors 810 can implement one or methods executed by a receiver (e.g., STR 112), such that the operating system 840 and the working memory 835 can implement features of the STR 112. In some embodiments, the working memory 835 includes non-transient, processor-readable memory having instructions stored thereon, which, when executed, cause the one or more processors 810 to perform steps including: assigning a first video to a first display layer of a plurality of display layers; responsive to receiving a first trigger signal, assigning by a first application, a first user interface associated with the first application to a second display layer, the first trigger signal causing the second display layer to be positioned over the first display layer; responsive to receiving a second trigger signal: transmitting, by the first application, a first request to a second application, the first request causing the second application to assign a second user interface corresponding to the second application with a third display layer, and position the third display layer over the second display layer; and sending, by the second application, a second request to generate a reduced size of the first video assigned to the first display layer, the second request causing: (1) a first portion of the third display layer and a second portion of the second display layer to be made transparent, wherein the first portion overlaps the second portion, and (2) positioning the reduced size of the first video beneath the first portion or the second portion; and generating the video signal based on a combination of the first display layer, the second display layer, and the third display layer.

A set of these instructions and/or codes can be stored on a non-transitory computer-readable storage medium, such as the non-transitory storage device(s) 825 described above. In some cases, the storage medium can be incorporated within a computer system, such as computer system 800. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 800 and/or can take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 800) to perform methods in accordance with various embodiments of the disclosure. According to a set of embodiments, some or all of the procedures of such methods are performed by the computer system 800 in response to processor 810 executing one or more sequences of one or more instructions (which can be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 can cause the processor(s) 810 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 800, various computer-readable media can be involved in providing instructions/code to processor(s) 810 for execution and/or can be used to store and/or carry such instructions/ code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 800. The communications subsystem 830 (and/or components thereof) generally will receive signals, and the bus 805 then can carry the signals (and/or the data, instructions, etc., carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed is:

1. A method for generating a video signal by a receiver, the method comprising:
   assigning, by the receiver, a first video to a first display layer of a plurality of display layers;
   responsive to receiving a first trigger signal, assigning by a first application, a first user interface associated with the first application to a second display layer, the first trigger signal causing the second display layer to be positioned over the first display layer;
   responsive to receiving a second trigger signal:
      transmitting, by the first application, a first request to a second application, the first request causing the second application to assign a second user interface corresponding to the second application with a third display layer, and position the third display layer over the second display layer, wherein
      the first application is independent and different than the second application; and
      sending, by the second application, a second request to a controller distinct from the first application and the second application to generate a reduced size of the first video assigned to the first display layer, the second request causing: (1) a first portion of the third display layer and a second portion of the second display layer to be made transparent, wherein the first portion overlaps the second portion, and (2) positioning the reduced size of the first video beneath the first portion or the second portion; and
   generating the video signal based on a combination of the first display layer, the second display layer, and the third display layer.

2. The method of claim 1, wherein the first trigger signal is received from a remote control device that is communicatively coupled with the receiver, and wherein the first trigger signal is generated upon a selection with respect to the remote control device being made by a user.

3. The method of claim 1, wherein the first user interface includes a plurality of tiles, each of which is associated with content provided by a service provider.

4. The method of claim 3, wherein the second trigger signal is received in response to a selection of one of the plurality of tiles included in the first user interface.

5. The method of claim 4, wherein the second user interface includes a plurality of icons and metadata associated with the one of the plurality of tiles selected from the first user interface.

6. The method of claim 1, further comprising:
responsive to receiving a third trigger signal, sending, by the second application, a third request that causes a second video to be assigned to the first display layer, resize the second video in the first display layer, and place the first display layer over the third display layer.

7. The method of claim 6, wherein the third trigger signal is received in response to a selection of one of a plurality of icons included in the second user interface.

8. The method of claim 6, wherein the second video is different than the first video, the first video corresponding to a recording associated with a service provider, and the second video including content associated with one of a plurality of tiles included in the first user interface.

9. The method of claim 1, further comprising:
obtaining, by the receiver, a parameter indicative of a size of a display screen, wherein the reduced size of the first video is equal to a fraction of the size of the display screen.

10. The method of claim 1, wherein a size of the first portion or the second portion is equal to the reduced size of the first video.

11. The method of claim 6, wherein an original size of the second video assigned to the first display layer is equal to the reduced size of the first video, and a final size of resized second video is equal to a size of a display screen.

12. A receiver for generating a video signal, the receiver comprising:
a processor; and
a memory including instructions that, when executed by the processor, cause the receiver to perform operations comprising:
assigning a first video to a first display layer of a plurality of display layers;
responsive to receiving a first trigger signal, assigning by a first application, a first user interface associated with the first application to a second display layer, the first trigger signal causing the second display layer to be positioned over the first display layer;
responsive to receiving a second trigger signal:
transmitting, by the first application, a first request to a second application, the first request causing the second application to assign a second user interface corresponding to the second application with a third display layer, and position the third display layer over the second display layer, wherein
the first application is independent and different than the second application; and
sending, by the second application, a second request to a controller distinct from the first application and the second application to generate a reduced size of the first video assigned to the first display layer, the second request causing: (1) a first portion of the third display layer and a second portion of the second display layer to be made transparent, wherein the first portion overlaps the second portion, and (2) positioning the reduced size of the first video beneath the first portion or the second portion; and
generating the video signal based on a combination of the first display layer, the second display layer, and the third display layer.

13. The receiver of claim 12, wherein the first trigger signal is received from a remote control device that is communicatively coupled with the receiver, and wherein the first trigger signal is generated upon a selection with respect to the remote control device being made by a user.

14. The receiver of claim 12, wherein the first user interface includes a plurality of tiles, each of which is associated with content provided by a service provider.

15. The receiver of claim 14, wherein the second trigger signal is received in response to a selection of one of the plurality of tiles included in the first user interface.

16. The receiver of claim 15, wherein the second user interface includes a plurality of icons and metadata associated with the one of the plurality of tiles selected from the first user interface.

17. The receiver of claim 12, wherein the memory further includes instructions that, when executed by the processor, causes the receiver to:
responsive to receiving a third trigger signal, sending, by the second application, a third request that causes a second video to be assigned to the first display layer, resize the second video in the first display layer, and place the first display layer over the third display layer.

18. One or more non-transitory, machine-readable media having machine-readable instructions thereon which, when executed by a processing device, causes the processing device to perform operations comprising:
assigning a first video to a first display layer of a plurality of display layers;
responsive to receiving a first trigger signal, assigning by a first application, a first user interface associated with the first application to a second display layer, the first trigger signal causing the second display layer to be positioned over the first display layer;
responsive to receiving a second trigger signal:
transmitting, by the first application, a first request to a second application, the first request causing the second application to assign a second user interface corresponding to the second application with a third display layer, and position the third display layer over the second display layer, wherein
the first application is independent and different than the second application; and
sending, by the second application, a second request to a controller distinct from the first application and the second application to generate a reduced size of the first video assigned to the first display layer, the second request causing: (1) a first portion of the third display layer and a second portion of the second display layer to be made transparent, wherein the first portion overlaps the second portion, and (2) positioning the reduced size of the first video beneath the first portion or the second portion; and
generating a video signal based on a combination of the first display layer, the second display layer, and the third display layer.

19. The one or more non-transitory, machine-readable media as recited in claim 18, wherein the first trigger signal is received from a remote control device that is communicatively coupled with the processing device, and wherein the first trigger signal is generated upon a selection with respect to the remote control device being made by a user.

20. The one or more non-transitory, machine-readable media as recited in claim 18, wherein the first user interface includes a plurality of tiles, each of which is associated with content provided by a service provider, and wherein the second trigger signal is received in response to a selection of one of the plurality of tiles included in the first user interface.

* * * * *